United States Patent [19]
Clemente

[11] Patent Number: 5,977,682
[45] Date of Patent: Nov. 2, 1999

[54] BRUSH HOLDER ASSEMBLY HAVING DYNAMIC LOADING

[76] Inventor: Roger Clemente, 11 Dorchester Wy., Shrewsbury, N.J. 07702

[21] Appl. No.: 09/173,317

[22] Filed: Oct. 15, 1998

Related U.S. Application Data

[63] Continuation-in-part of application No. 09/010,251, Jan. 21, 1998, Pat. No. 5,905,323.

[51] Int. Cl.⁶ .......................... H01R 39/38; H01R 39/40; H01R 39/18; H02K 9/28
[52] U.S. Cl. .......................... 310/239; 310/242; 310/247; 310/248; 310/227
[58] Field of Search .................................... 310/239, 242, 310/245, 246, 247, 248, 227, 244, 240, 241, 64–65

[56] References Cited

U.S. PATENT DOCUMENTS

| | | | |
|---|---|---|---|
| 1,671,533 | 5/1928 | Lindall | 310/244 |
| 2,348,684 | 5/1944 | Perkins | 171/324 |
| 2,548,631 | 4/1951 | Stapleton | 171/323 |
| 2,755,399 | 7/1956 | Phillips | 310/244 |
| 2,864,019 | 12/1958 | Gordon | 310/247 |
| 2,989,656 | 6/1961 | Herbst | 310/247 |
| 3,025,421 | 3/1962 | Sievert | 310/245 |
| 3,456,696 | 7/1969 | Gregory et al. | 143/43 |
| 4,371,803 | 2/1983 | Schindel et al. | 310/242 |
| 4,785,214 | 11/1988 | Mummert | 310/241 |
| 5,156,225 | 10/1992 | Murrin | 180/65.1 |

*Primary Examiner*—Nestor Ramirez
*Assistant Examiner*—Dang Dinh Le
*Attorney, Agent, or Firm*—Louis E. Marn

[57] ABSTRACT

An improved method for the manufacture of a compact brush guide holder assembly which is commonly found on machines in which electricity is to be transferred between an electrically conductive brush element as it moves and makes contact with a rotatable conductor such as a commutator. The brush holder assembly constructed of material that reduces antifrictional forces having a guiding channel or chamber defined by upper and lower curvilinear surface for supporting the electrically conductive brush element which receives compressed tension from a fixed non-removable constant force spring which is composed of a beam uncoiled section in addition to a coiled section having integrally fixed mounted Teflon bushings that are free to ride and float horizontally and vertically on mounting post that pass through its center. Upon compression, the contour structural integrity and memory characteristics of the constant force spring are maintained as it self adjusts to the dynamic loads and tension requirements of a rush as it biases a commutator.

18 Claims, 2 Drawing Sheets

BRUSH HOLDER ASSEMBLY HAVING DYNAMIC LOADING

This is a continuation-in-part application of U.S. Ser. No. 09/010,251, filed Jan. 21, 1998, now U.S. Pat. No. 5,905,323.

BACKGROUND OF INVENTION

1. Field of Invention

This invention relates to electric machines, and more particularly to a brush holder assembly for an electric motor.

2. Brief Description of Prior Art

Brush holder assemblies which control the movement of the brush against the commutator have a critical effect on overall motor performance. There are numerous designs which are currently used by motor manufactures including assemblies which use constant force springs to control brush movement against the armature. Some assemblies limit brush loading to the front while others can be loaded from the back. On the latter, the constant force spring must be removed to install a new brush. Both designs limit brush movement, restrict brush cooling, require complicated brush holder designs, and necessitate substantial space for installation. Previous assemblies restrict how the constant-force spring is held in place because the spring manufacturers recommendations limit the approved method to return the constant-force spring to the outside portion of the coiled sections. There is the need for an improved brush holder assembly to hold the inside coil sections of the constant force spring which do not interfere with brush loading and at the same time improves commutation while reducing electromagnetic interference.

OBJECTS OF THE INVENTION

An object of the present invention provides for a method of brush holder manufacturing which improves brush performance characteristics, reduces manufacturing costs, and provides for more useable space inside the motor.

Another object of the present invention is to provide a simplified brush holder assembly for an electric motor which has a fixed, non-removable, floating, constant-force spring having extended travel length which allows the brush to be installed through the front or the back of the brush guideway assembly during initial motor assembly or removed and replaced externally from the back of the brush guideway without motor disassembly.

Yet another object of the present invention is to provide an improved multiple method of brush latching and unlatching during motor assembly.

Another object of the present invention allows a brush to be guided, supported and held in place by a fixed, non-removable, floating, inter-locking constant-force spring resulting in the formation of the major integral structural component of the brush holder assembly.

Another object of the present invention is to provide a brush holder assembly constructed of plastic dielectric material having polyfluorothylene properties as a means to reduce interfrictional forces.

A further object of the present invention is to provide an open body brush guide assembly having a fixed, non-removable, constant-force spring which supplies compressed tension that allows a brush to float inside the brush holder by self-adjusting to the critical dynamic loads, including centrifugal, axial, radial, thrust and recoil as it travels toward the commutator.

Still another object of the present invention provides for an improved brush holder assembly that increases the dynamic movement of both the brush and constant-force spring.

Yet another object of the present invention provides for a brush housed in brush holder assembly that reduces arcing improves brush commutation and reduces electromagnetic interference.

It is another object of the present invention to provide a brush holder assembly which improves the travel movement of a brush against the commutator which results in not only improving life expectancy of both components, but also substantially reducing motor noise.

Still yet another object of the present invention is to provide a brush holder assembly permitting a better ventilated brush which decreases component temperature thereby increasing current carrying capabilities.

Another object of the present invention is to provide an insulated brush holder assembly made of a dielectric material mounted directly to a conductive surface.

Another object of the present invention is to allow the spring to self adjust to dynamic loads of a brush as it biases a commutator while maintaining uniform spring memory characteristics, contour and tension on multiple brush applications.

Still another object of the present invention is to provide a compact streamlined brush holder assembly which not only requires less area for installation, but also allows utilization of a longer oversized brush.

It is another object of the present invention to reduce the surface area contact between the brush and the holder, thereby improving brush cooling while reducing friction between components.

Another object of the present invention is to provide for a brush holder assembly that does not restrict the use of a brush having multiple leads.

Another object of the present invention provides a novel way for the inside coils of a constant-force spring having Teflon tube bushing inserts to be held without restricting performance.

Yet another object of the present invention is to increase the overall smoothness and travel capabilities of the brush.

Still yet another object of the present invention allows the constant-force spring to be permanently held in place thereby eliminating the need to remove the spring when changing the brush.

Yet another object of the present invention is to provide better memory control of a constant-force spring when it is compressed and uncoils against the brush.

SUMMARY OF THE INVENTION

These and other objects of the present invention are achieved by a brush holder assembly for an electric motor or generator wherein a floating, non-removable, extra-long, constant-force spring is held in place by post supporting Teflon bushing inserts installed inside coils of the constant-force spring which upon compression structurally supports, guides, and holds a brush disposed in a chamber having upper and lower curvilinear surfaces formed in a housing member that provides a multiple method for brush installation, removal, latching, and unlatching and allows the dynamic movement and control of a brush as it moves towards a commutator.

BRIEF DESCRIPTION OF THE DRAWINGS

These and other objects of the present invention will be more readily understood by reference to the following detailed description when taken with the accompanying drawings wherein like numerals designate like parts throughout, and wherein.

DETAILED DESCRIPTION OF THE DRAWINGS

Figure 1:
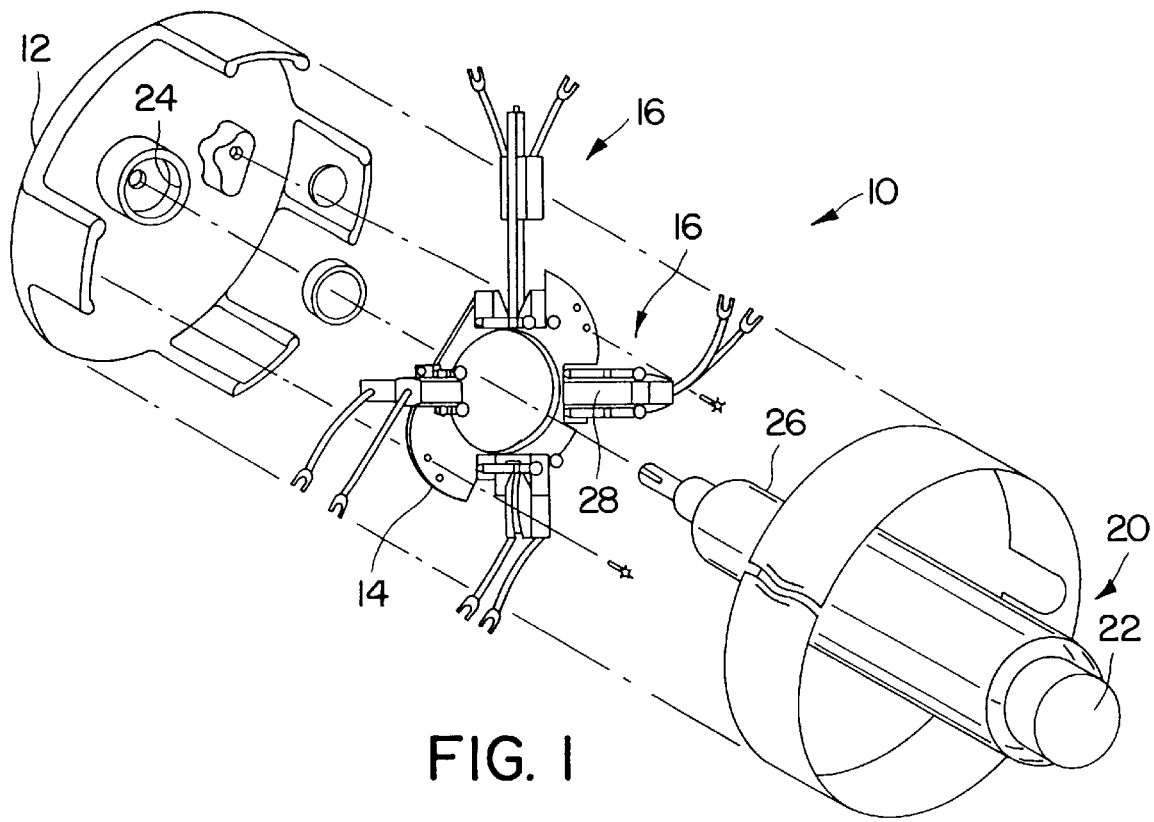
FIG. 1 is a partial fragmentary, isometric view of a portion of a dynamoelectric machine illustrating the brush and brush holder assembly of the present invention.
Figure 2:
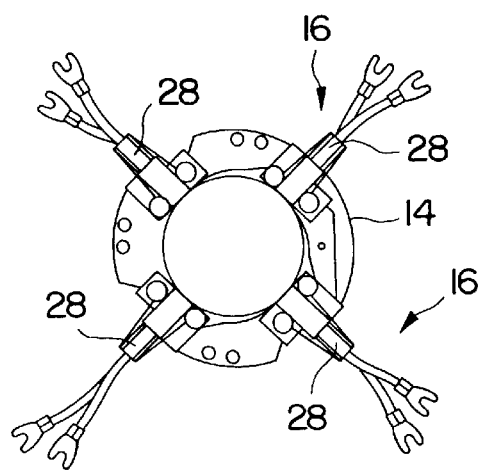
FIG. 2 is an elevational view of the yoke of the dynamoelectric machine of FIG. 1.

Referring now to the drawings, and particularly FIGS. 1 and 2, there is illustrated a dynamoelectric machine, generally indicated as 10. The dynamoelectric machine 10 may be a conventional DC motor having a tubular frame (not shown) and a cover or end frame 12, attached to an open end of the tubular frame, such as by bolts (not shown) in a conventional manner. An insulated support or yoke member 14 is provided with a plurality of brush and brush holder assemblies, generally indicated as 16, disposed equidistantly and radially on the yoke 14. The yoke 14 is fastened to the end frame 12 of the machine 10 in a manner known to one skilled in the art. The yoke 14 is preferably fabricated from a thermosetting dielectric material and is formed with orifices to provide for the mounting of each brush holder assembly 16 as well as to provide mounting of the yoke 14 to the end frame member 12 of the machine 10.

Interiorly of the tubular frame of the machine 10, there is provided an armature or rotor, generally indicated as 20, rotatably positioned within a field structure (not shown). Such field structure is conventional and may include permanent magnetic field or include windings connected to terminal posts leading to the exterior of the housing in a manner known to one skilled in the art. The armature 20 is provided with a shaft 22 journaled for rotation within a recessed portion or cavity 24 formed in the end frame 12. A thrust washer (not shown) may be provided between a bearing and the rotor 20. The shaft 22 of the armature 20 is provided with a commutator 26 formed with a peripheral surface which cooperates with equidistantly radially-extended brushes 28 slidably mounted in a respective brush holder assembly 16, as more fully hereinafter discussed.

Figures 3, 4:
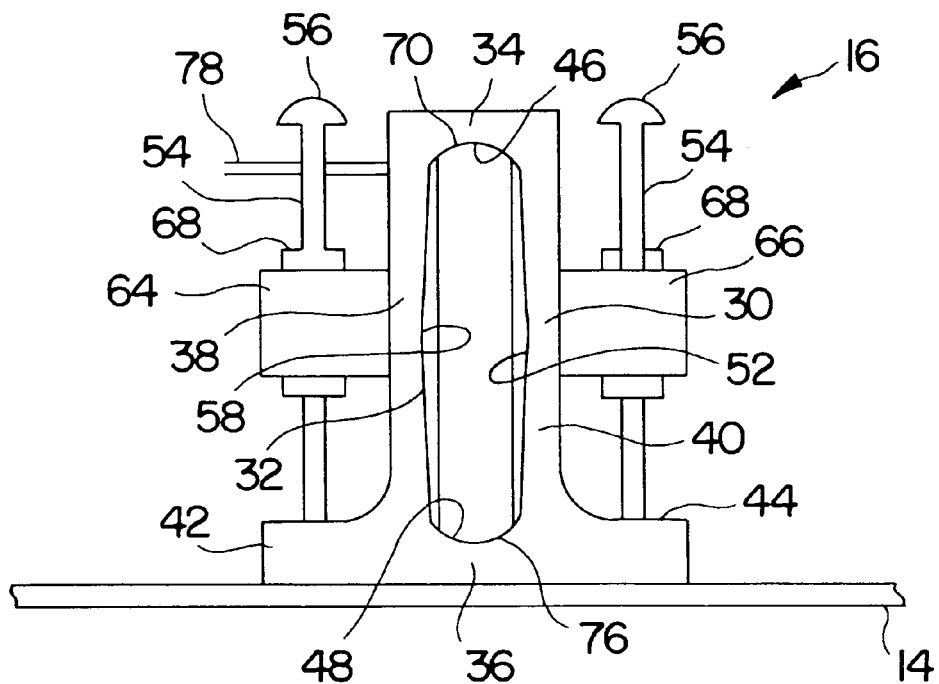
FIG. 3 is a front view of the brush and brush holder assembly of the present invention.
FIG. 4 is a cross-sectional side view thereof.

The brush holder assembly 16 of the present invention, referring now to FIGS. 3 and 4, is comprised of a generally rectangularly-shaped, elongated housing member 30 which can be made in plastic, metal or a combination of both defining an elongated open guiding chamber 32 and formed with upper and lower end walls 34 and 36, parallelly-disposed side walls 38 and 40 and outwardly extending leg portions 42 and 44 perpendicularly-disposed to the side walls 38 and 40, respectively. The housing member 30 may be formed of dielectric thermosetting plastic material, such as Teflon (a registered trademark of E.I. duPont de Nemours), such as by injection, molding, casting or formed from a sold body of such material. The front and rear open chamber 32 of the housing member is defined by upper and lower outwardly extending curvilinear surfaces 46 and 48 and outwardly extending curvilinear side surfaces 50 and 52 formed in the upper and lower end walls 34 and 36 and side walls 38 and 40, respectively, so that the outside surface edge is similar to a tuba shape. The housing member 30 is radially mounted by fasteners such as nuts and bolts to the yoke 14.

An elongated pin member 54 having an upper top head 56 is mounted on both sides of the housing 30 parallelledly-disposed to the housing member 30. Each pin member 54 is mounted within orifices (not shown) in the leg portions 42 and 44 of the housing member 30 to the yoke 14.

A twin coil spring member 60 of a constant tension force having a main body portion 62 and end coil portions 64 and 66 is disposed about the housing member 30 with each coil portion integrally mounted on a plastic cylindrically-shaped bushing member 68. Each plastic bushing member 68 is formed with a centrally-disposed channel for rotatable mounting on each pin member 54, as illustrated in FIGS. 3 and 4. The plastic bushing member 68 is formed of a dielectric plastic material exhibiting reduced interfrictional forces, such as polyfluroethylene, (e.g. Teflon, a registered trademark of E.I. duPont de Nemours and Co.). The elongated armature brush member 28 including conductors 72 is positioned within the elongated chamber 32 wherein the main body portion 62 of the twin coil spring member 60 is biased against an end portion 74 of the brush member 28, as illustrated in FIG. 4, and as more fully hereinafter described. The elongated brush member 28 is formed with upper and lower curvilinear surfaces 74 and 76 which are coincident and cooperate with the upper and lower curvilinear surfaces 46 and 48, respectively, of chamber 32 formed by upper and lower end walls 34 and 36 and side walls 38 and 40.

In assembly, the elongated brush member 28 is introduced into the chamber 32 through the front opening of the housing member 30 and inserted against the main body portion 62 of the coil spring member 60 to a point where the brush member 28 is fully inserted within the housing chamber 46 and an orifice 77 formed in the brush member 28 is accessible for inserting of a plastic string member 78 to hold the brush member 28 in a pre-loading position. After mounting the brush and brush holder assemblies on the yolk 14 and positioning of the yolk 14 in the motor assembly 10 with the armature 20 suitably positioned therein, each plastic string member 78 is withdrawn to release the brush member 28 to cause the brush member 28 to contact the commutator 26 of the armature 20 under the biasing spring force of the coil spring member 60.

Alternately, the brush member 28 may be positioned within the chamber 46 of the housing member 30 by causing the main body 62 of the twin coil spring member 60 to be pulled backwards to a point permitting positioning of the brush member 28 in an opening in the rear portion of the housing member 30 with subsequent pre-loading positioning of the brush member 28 effected by the string member 78 as herein above discussed.

In operation, the main body portion 62 of the constant tension spring 60 biases the brush member 28 against the armature with the bushing member 68 being permitted to pivot, float and swivel about the pin member 30, i.e. move up and down in response to varying forces thereby to insure continuous, proper contact between the brush member 28 and the armature of the motor. In addition the main body portion 62 of the twin coil spring member having an extended travel length can be pulled back to a position which allows the brush member 28 to be replaced outside of housing member 30.

While the invention herein has been described in connection with exemplary embodiments thereof, it will be understood that many modifications will be apparent to those of ordinary skill in the art and that this application is intended to cover any adaptations or variations thereof. Therefore, it is manifestly intended that this invention be only limited by the claims and the equivalents thereof.

What is claimed:

1. A brush holder assembly for use in a machine in which electricity is to be transferred between a rotatable conductor and an electrically-conducting brush element with an electrical wire extending therefrom and biased to make contact with said rotatable conductor, and wherein said brush holder assembly is rigidly mounted on a yoke of said machine, which comprises:

a housing member mounted on said yoke and formed with a chamber defined by upper and lower curvilinear surfaces to receive said electrically-conducting brush element, said brush element having an upper and lower radial surface;

spring member including a body portion and end coil portions wherein said body portion biases said electrically-conducting brush element towards said rotatable conductor;

plastic bushing member integrally disposed in said end coil portion of said spring member, said plastic bushing member formed of a plastic dielectric material; and means for rigidly supporting said plastic bushing member to said brush holder assembly.

2. The brush holder assembly as defined in claim 1 wherein said upper and lower curvilinear surfaces of said chamber of said housing member are outwardly extending.

3. The brush holder assembly as defined in claim 2 wherein chamber of said housing member is defined with outwardly extending curvilinear side surfaces.

4. The brush holder assembly as defined in claim 2 wherein said housing member is formed with outwardly-disposed leg portions for connecting said housing member to said yoke.

5. The brush holder assembly as defined in claim 1 wherein said plastic bushing member is cylindrically-shaped.

6. The brush holder assembly as defined in claim 4 wherein said means for rigidly supporting said plastic bushing member comprises a pin member extending upwardly from said leg portion of said housing member.

7. The brush holder assembly as defined in claim 6 wherein said pin members are provided with upper head portions to restrict upper movement of said cylindrically-shaped plastic bushing members mounted thereon.

8. The brush holder assembly as defined in claim 1 wherein said spring member means is a constant force tension spring having an extended travel length.

9. The brush holder assembly as defined in claim 1 wherein said plastic bushing members are formed of a polyfluoroethylene thermoplastic material.

10. A brush holder assembly for use in an electric machine which comprises:

a plastic dielectric housing member having a chamber formed with upper and lower curvilinear surface for an electrically-conducting brush element, said brush member having an upper and lower radial surface;

spring element including a body portion and end coil portions extending about said housing member;

a plastic dielectric bushing member integrally disposed in each of said end coil portions of said spring member; and means for supporting said plastic dielectric bushing members on said plastic dielectric housing member.

11. The brush holder assembly as defined in claim 10 wherein said upper and lower curvilinear surface of said chamber of said plastic dielectric housing member are outwardly extending.

12. The brush holder assembly as defined in claim 11 wherein said chamber of said housing member is formed with outwardly-extending curvilinear side surfaces.

13. The brush holder assembly as defined in claim 12 wherein said plastic dielectric housing member is formed with outwardly-extending leg portions.

14. The brush holder assembly as defined in claim 13 wherein pin members are disposed within each of said leg portions of said plastic dielectric housing member for positioning said cylindrically-shaped plastic dielectric bushing members.

15. The brush holder assembly as defined in claim 14 wherein said pin members are provided with upper head portions to restrict movement of said cylindrically-shaped plastic dielectric bushing members.

16. The brush holder assembly as defined in claim 10 wherein each of said plastic bushing members is cylindrically-shaped.

17. The brush holder assembly as defined in claim 10 wherein said spring member is a constant force tension spring having an extended travel length.

18. The brush holder assembly as defined in claim 10 wherein said plastic dielectric housing and bushing members are formed of a polyfluoroethylene thermoplastic material.

* * * * *